United States Patent [19]
Kraft

[11] 3,770,109
[45] Nov. 6, 1973

[54] SCREW CONVEYOR SHAFT SUPPORTING STRUCTURE

[75] Inventor: Robert E. Kraft, Naperville, Ill.

[73] Assignee: FMC Corporation, San Jose, Calif.

[22] Filed: June 8, 1972

[21] Appl. No.: 260,941

[52] U.S. Cl.................... 198/213, 248/16, 308/20
[51] Int. Cl..................... B65g 33/24, F16f 15/00
[58] Field of Search.................. 198/213, 64, 204; 308/20, 31, 34; 248/14, 16

[56] References Cited
UNITED STATES PATENTS
3,558,017  1/1971  Soojian........................... 198/213 X
2,098,061  11/1937  Munoz................................ 248/16

FOREIGN PATENTS OR APPLICATIONS
84,548  2/1957  Netherlands........................ 198/213

Primary Examiner—Edward A. Sroka
Attorney—F. W. Anderson et al.

[57]  ABSTRACT

A screw conveyor is disclosed with an end plate having an opening through which the shaft of the screw extends. The end plate has mounting holes symmetrically arrayed around the opening for the shaft to receive either an end plate bearing to support the shaft, or a bracket having a shelf on which a pillow block is mounted to support the shaft. The bracket can be mounted in a selected orientation to position the pillow block according to the requirement of a particular installation. A shaft seal is mounted on the bracket over the shaft opening.

9 Claims, 7 Drawing Figures

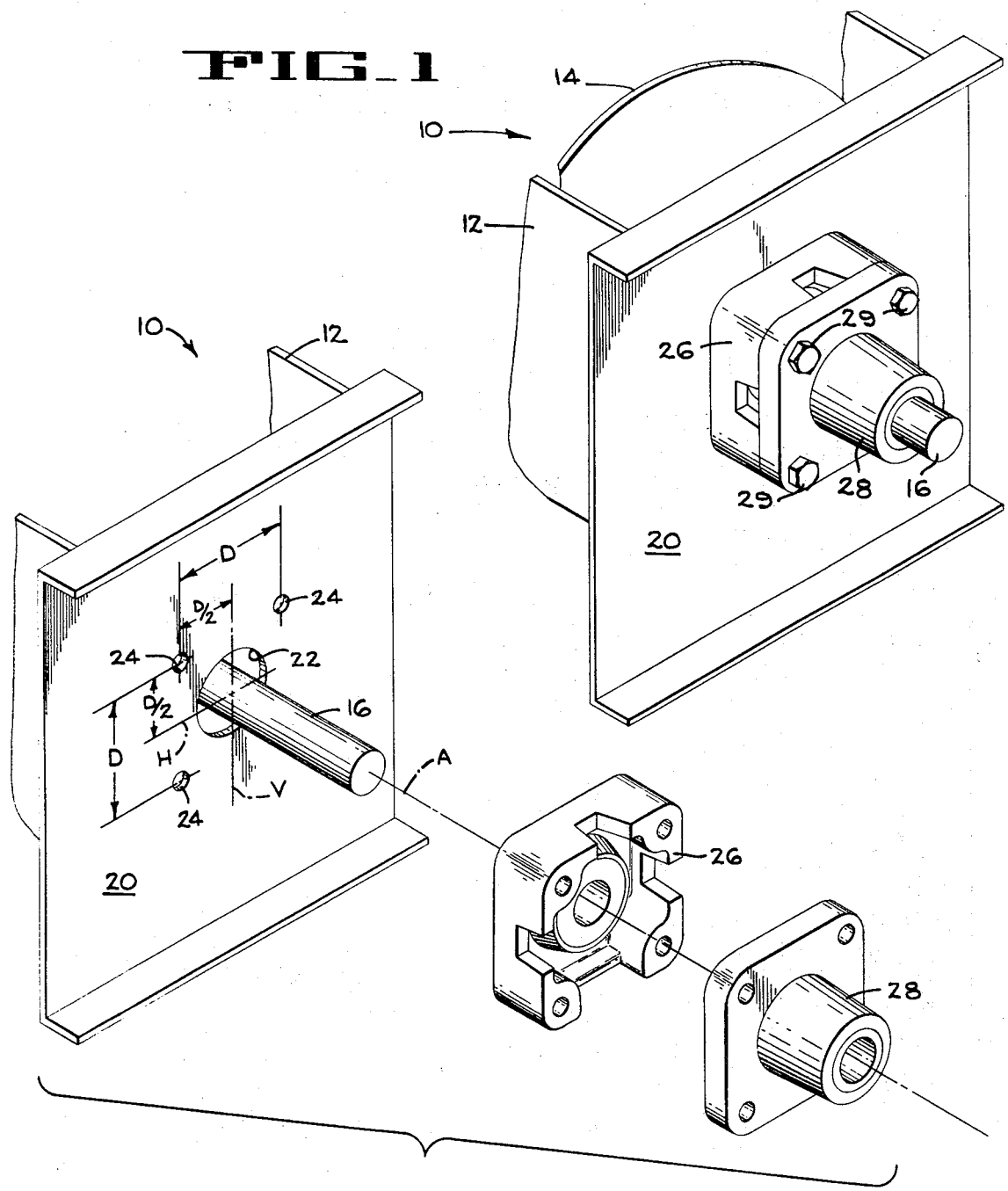
FIG_1
FIG_2

PATENTED NOV 6 1973 3,770,109
SHEET 2 OF 3
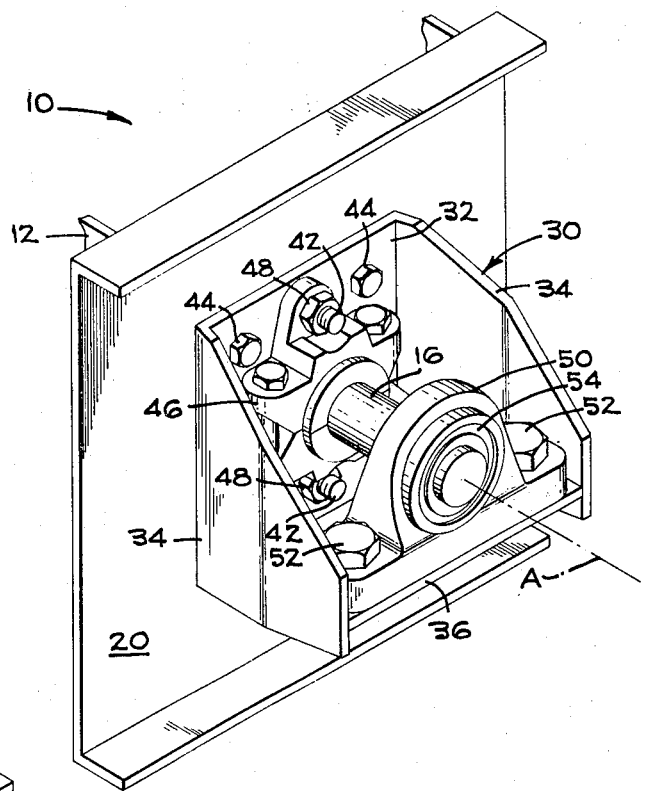
FIG_3
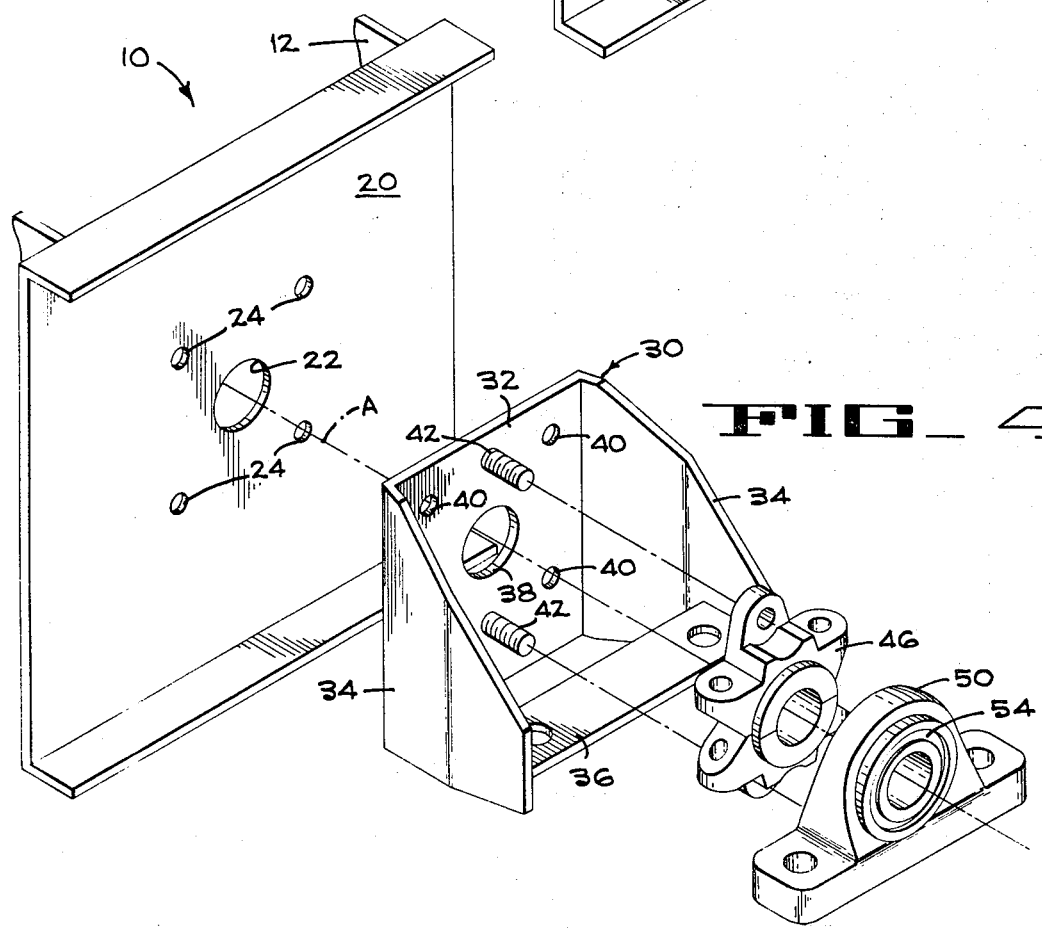
FIG_4

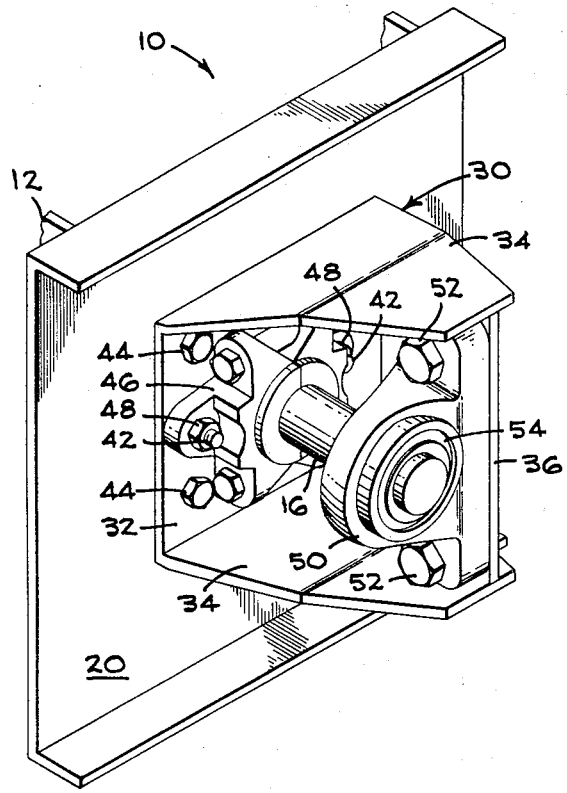
FIG_5
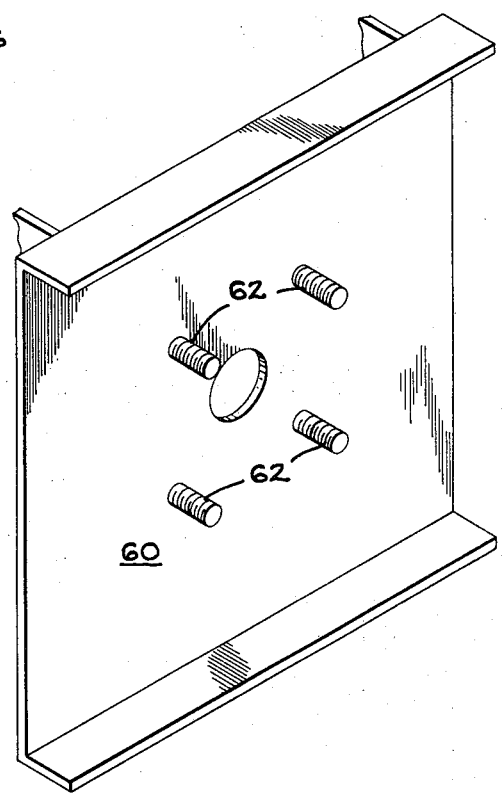
FIG_7
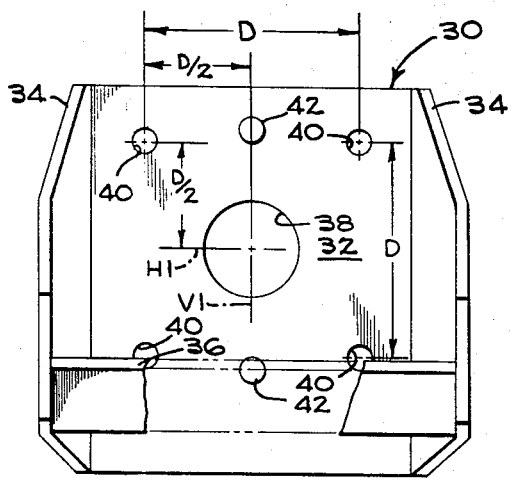
FIG_6

SCREW CONVEYOR SHAFT SUPPORTING STRUCTURE

BACKGROUND OF THE INVENTION

The present invention relates to screw conveyors and, more particularly, to the screw shaft terminal, or end plate, construction of a screw conveyor. The invention has the purpose of combining screw conveyor drive or tail elements in a way that permits the alternate assembly of two basic and different types of terminals from a limited number of different parts. Several variations of one of these two types of terminals can be made by rotating the bearing support element, permitting the bearing to be supported from below, above or from either side.

Two types of screw conveyor terminals are referred to, respectively, as "plate type" and "shelf type." A plate type terminal consists of a flat end plate with holes for attaching a flanged bearing with bolts. The conveyor screw shaft extends through the end plate and is supported by the bearing. A seal element to prevent leakage of the material from the trough may be interposed between the end plate and the bearing. A conventional shelf type terminal has a platform attached to the trough end plate. The platform supports a pillow block type of bearing which receives the end of the screw shaft for the support thereof. The purpose of a shelf mounted pillow block on the end plate is to move the bearing away from the trough end plate to permit various seals or glands to be applied which are not readily applied to a plate type terminal, and to provide greater protection for the bearing from the abrasive and corrosive nature of material in the conveyor. Sometimes the platform is located above the bearing to protect the bearing from above, or to provide improved access to the bearings if the conveyor is located close to the ceiling.

When the number of variables in shelf type trough ends is considered, it will be seen that several hundred different units are required to satisfy every different condition. The variables include: diameter of the screw conveyor shaft, number of bearings required, orientation of the bearing support shelf, and type of seal or gland used. Some effort has been made in the past to reduce the number of trough end plates required by attaching the bearing shelf with bolts using slotted holes so the shelf could be raised or lowered to permit some variation in shaft and bearing selection for a single trough end plate.

SUMMARY OF THE INVENTION

In the present invention a trough end plate construction is provided which permits assembly of many shelf type terminals using plate type trough ends. In the preferred form of the invention, a trough end plate is provided having an opening through which the screw shaft is received, and having four symmetrical mounting holes surrounding the opening. If a plate type bearing is desired to support the screw shaft, it is bolted onto the end plate, usually with a seal interposed between the bearing and the end plate. If, on the other hand, a shelf type bearing is required, the same end plate will accommodate a bracket which has a shelf thereon to support a pillow block in which the screw shaft is received. If the particular installation requires a pillow block mounted above, or to either side of, the screw shaft, the same trough end plate can be used. Since the mounting holes on the trough end plate are symmetrically arrayed around the opening through which the screw shaft extends, and since the holes on the bracket are also symmetrical, it is only necessary to orient the bracket with the shelf in the desired position when securing the bracket to the trough end plate.

Alternatively, studs can be utilized on the trough end plate in place of mounting holes.

It is therefore one object of the present invention to minimize the number of parts required for desired variations in a screw conveyor terminal construction.

It is another object of the present invention to provide a construction which permits use of the same screw conveyor trough end plate to mount either a plate bearing or a shelf bearing.

It is still another object of the present invention to provide a construction which permits the use of the same screw conveyor trough end plate to mount either a shelf bearing in any desired orientation, or a plate bearing.

BRIEF DESCRIPTION OF THE DRAWINGS

FIG. 1 is a view in perspective showing a screw conveyor terminal construction with a trough end plate having a plate bearing mounted thereon.

FIG. 2 is s view taken as the view of FIG. 1 showing the conveyor terminal construction of FIG. 1 in exploded form.

FIG. 3 is a view in perspective of a screw conveyor terminal construction with the same trough end plate as shown in FIGS. 1 and 2 but with a shelf supported pillow block thereon.

FIG. 4 is a view taken as the view of FIG. 3 but with the parts shown in exploded form.

FIG. 5 is a view similar to the view of FIG. 3 but with the shelf oriented differently to accommodate a particular installation.

FIG. 6 is a front view in elevation of the shelf bracket.

FIG. 7 is a view in perspective of a modified end plate.

DESCRIPTION OF THE PREFERRED EMBODIMENTS

There is shown in FIG. 1 the end portion of a screw conveyor 10 having a trough 12 with a screw 14 rotatably received therein. The screw has a screw shaft 16 extending from each end. One of the screw shafts is connected to drive mechanism (not shown) while the other extends from the opposite end of the trough. Although the structure of the present invention can be utilized at either end of the screw conveyor, the end opposite the drive end is illustrated for the purposes of simplicity, since the conveyor drive means, as such, forms no part of the present invention.

As shown best in FIG. 2, the screw conveyor trough has an end plate 20 with a circular opening 22 to receive the screw shaft 16 therethrough. Symmetrically arrayed around opening 22 are four mounting holes 24, each positioned at the corner of an imaginary square (with two sides horizontal and two sides vertical). Each hole is spaced a distance D from the two holes adjacent thereto, and each hole is spaced a distance D/2 from the horizontal axis H and the vertical axis V which intersect on the central longitudinal axis A of opening 22 (and the longitudinal axis of shaft 16 when the shaft is centered in opening 22).

Trough end seal 26 and trough end bearing 28 are secured to trough end plate 20 by means of bolts 29. The trough end seal 26 prevents material from the trough leaking out through opening 22 in end plate 20, and the end bearing 28 supports the screw shaft and screw.

FIG. 3 shows a shelf supported bearing mounted on the same trough end plate 20 as was utilized to mount the end plate bearing 28. A bracket 30 (see FIG. 6) has an end plate 32, two side plates 34, and a shelf 36 (formed from an angle member) extending between the side plates 34. The bracket end plate 32 has an opening 38 and four mounting holes 40 spaced apart the same distance D as the holes of end plate 20. The holes 40 are arrayed symmetrically around opening 38 (the vertical and horizontal centerlines V1 and H1 of which are a distance D/2 from each hole) for registration with mounting holes 24 of end plate 20. The center of opening 22 is in registration with the center of opening 38 when the holes 24 of end plate 20 are in registration with the holes 40 of bracket 30. The bracket end plate also has two studs 42 positioned above and below opening 38.

As shown best in FIG. 3, the bracket 30 is mounted on the trough end plate 20 by means of bolts 44 received in the four matched mounting holes of trough end plate 20 and bracket end plate 32. A seal gland 46 is mounted on studs 42 and secured thereon by nuts 48. A pillow block 50 is secured to shelf 36 by bolts 52. The pillow block 50 has an antifriction bearing 54 mounted therein to receive and support the end of screw shaft 16.

The bracket 30 can be mounted on end plate 20 in any of four orientations: one with the shelf 36 horizontal as shown in FIG. 3, one 90° clockwise from the position of FIG. 3, one 90° counterclockwise from the position of FIG. 3 (see FIG. 5), and one 180° from the position of FIG. 3. This is possible because the mounting holes 24 of end plate 20, and the mounting holes 40 of bracket 30, are at the four corners of squares of equal size, the centers of which are on axis A. The center of opening 38 in bracket 30, and the center of opening 22 in end plate 20, lie on the desired axis of the screw shaft 16, and lie in centered relationship on axis A to the two sets of mounting holes 24 and 40. Thus, the centerline of bearing 54 coincides with the central axis A through the openings 22 and 38 in any of the four possible positions of the bracket 30 on end plate 20.

The orienation of bracket 30 on end plate 20 shown in FIG. 3 is the most suitable position for the bracket when the conveyor is mounted on the floor, and the most convenient access is from above. If the most accessible area is at the left of the conveyor, it would be desirable to mount the bracket 30 on the end plate as shown in FIG. 5. Conversely, if the most accessible zone is to the right, the bracket 30 would be mounted on end plate 20 180° from the position shown in FIG. 5. In some instances, it is desirable to install the bracket 30 with the shelf directly above the screw shaft 16 to protect the bearing and shaft from some overhead source of abrasive material which might otherwise fall on the bearing support.

There is shown in FIGS. 7, a conveyor end plate 60 which, instead of having mounting holes 24 as the end plate 20, has four studs 62 positioned as the holes 24 of end plate 20. It will be noted that the seal 26 and bearing 28 can be mounted on the studs 62 of end plate 60 in the same manner as mounted by bolts on end plate 20. Similarly, the bracket 30 can be mounted on the studs 62 (in four different orientations) in the same manner as the bracket is mounted on end plate 20.

Although the best mode contemplated for carrying out the present invention has been herein shown and described, it will be apparent that modification and variation may be made without departing from what is regarded to be the subject matter of the invention.

What is claimed is:

1. In a screw conveyor having a trough end having a shaft-mounted screw therein, the combination comprising an end plate secured to one end of said trough, said end plate having an opening therein through which said shaft extends, means to mount an end bearing to said end plate over said opening to support said shaft, a bracket alternatively connectable to said end plate by means of said end bearing mounting means, when said end bearing is not utilized, and a bearing mounted on said bracket to support said shaft.

2. In a screw conveyor having a trough and having a shaft-mounted screw therein, the combination comprising an end plate secured to one end of said trough, said end plate having an opening therein through which said said shaft extends, said end plate having openings around said shaft opening to connect an end bearing over said shaft opening, a bracket alternatively connectable to said end plate through the same openings provided for said end bearing when said end bearing is not utilized, and a pillow block mounted on said bracket to receive said screw shaft.

3. In a screw conveyor having a trough and having a shaft-mounted screw therein, the combination comprising an end plate secured to one end of said trough, said end plate having an opening therein through which said shaft extends, said end plate having bolt holes symmetrically arrayed around said shaft opening to connect an end bearing over said shaft opening, a bracket having a symmetrical array of bolt holes for connection to said end plate through the same openings provided for said end bearing when said end bearing is not used, said symmetrical array of mounting holes permitting connection of said bracket to said end plate in several different orientations, said bracket having a mounting shelf thereon, and a pillow block mounted on said shaft to receive and support said shaft.

4. The mechanism of claim 3 including means on said bracket to mount a shaft seal over said shaft opening to receive the shaft therethrough.

5. A screw conveyor having a trough and having a shaft-mounted screw therein, an end plate secured to one end of said trough, said end plate having an opening therein through which said shaft extends, said end plate adapted to receive alternatively an end bearing or a bracket, and a pillow block mounted on said bracket to support said shaft when the end bearing is not used.

6. The apparatus of claim 5 in which said bracket has a shelf to mount said pillow block, and in which said bracket is mountable on said end plate in several orientations for selected positioning of said pillow block.

7. The apparatus of claim 1 in which a shaft seal is connected to said bracket to surround a shaft extending through said bracket and seal in the contents of said trough.

8. The apparatus of claim 3 in which said bracket is connectable to said end plate in four equally spaced apart positions.

9. The apparatus of claim 8 in which one of said bracket positions is with the pillow block mounting shelf horizontal.

* * * * *

UNITED STATES PATENT OFFICE
CERTIFICATE OF CORRECTION

PATENT NO. : 3,770,109
DATED : NOVEMBER 6, 1973
INVENTOR(S) : ROBERT E. KRAFT

It is certified that error appears in the above-identified patent and that said Letters Patent are hereby corrected as shown below:

Column 4, line 44:   change "shaft" to --shelf--.

Signed and sealed this 20th day of May 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

PATENT NO. : 3,770,109
DATED : NOVEMBER 6, 1973
INVENTOR(S) : ROBERT E. KRAFT

It is certified that error appears in the above-identified patent and that said Letters Patent are hereby corrected as shown below:

Column 4, line 10: change "end" to --and--.

Signed and Sealed this sixth Day of January 1976

[SEAL]

Attest:

RUTH C. MASON
*Attesting Officer*

C. MARSHALL DANN
*Commissioner of Patents and Trademarks*